(12) United States Patent
Megiddo (10) Patent No.: US 6,574,676 B1
(45) Date of Patent: Jun. 3, 2003

(54) SYSTEM AND METHOD FOR SCHEDULING DISK DRIVE COMMANDS BY EXPECTED TOTAL ACCESS TIME

(75) Inventor: Nimrod Megiddo, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/481,255

(22) Filed: Jan. 11, 2000

(51) Int. Cl.$^7$ .............................................. G06F 13/14
(52) U.S. Cl. ........................... 710/5; 710/102; 711/111; 711/112; 711/158
(58) Field of Search ....................... 710/5, 102; 711/111, 711/112, 158

(56) References Cited

U.S. PATENT DOCUMENTS

| | | | |
|---|---|---|---|
| 4,636,883 A | 1/1987 | Hashimoto | 360/78 |
| 4,899,234 A | 2/1990 | Genheimer | 360/78.12 |
| 5,132,855 A | 7/1992 | Waugh et al. | 360/78.07 |
| 5,381,282 A | 1/1995 | Arai et al. | 360/78.09 |
| 5,570,332 A | 10/1996 | Heath et al. | 360/50 |
| 5,664,143 A | 9/1997 | Olbrich | 711/112 |
| 5,729,718 A | * 3/1998 | Au | 711/111 |
| 5,854,941 A | * 12/1998 | Ballard et al. | 710/5 |
| 6,002,540 A | 12/1999 | Cunnigham et al. | 360/77.04 |
| 6,170,042 B1 | * 6/2001 | Gaertner | 711/158 |
| 6,311,256 B2 | * 10/2001 | Halligan et al. | 711/158 |
| 6,442,648 B1 | * 8/2002 | Genduso et al. | 711/112 |

* cited by examiner

Primary Examiner—Jeffrey Gaffin
Assistant Examiner—Abdelmoniem Elamin
(74) Attorney, Agent, or Firm—Samuel A. Kassatly (57) ABSTRACT

A system and method that utilize a scheduling algorithm to reorder queued I/O commands in rotating disk drives. The reordering is implemented by selecting commands based on a probabilistic approach that minimizes the expected next command access time. Thus, the scheduling algorithm allows data to be accessed in the shortest possible expected time, and maximizes the throughput of the drive. The scheduling algorithm improves the I/O average access time by estimating the expected access time (EAT) for the queued commands, and by reordering these commands so that the command with the least expected access time (LEAT) is executed first. The scheduling algorithm weights the possible access times of commands stored in the scheduling queue, and accounts for the probability of executing a command during a first possible revolution or cycle, as well as the probability of executing the command in the second possible revolution. Both of these probabilities are taken into consideration in reaching a final determination as to the queue order of the commands. This allows for taking calculated risks in scheduling commands so as to minimize long-term average latency.

44 Claims, 5 Drawing Sheets

SYSTEM AND METHOD FOR SCHEDULING DISK DRIVE COMMANDS BY EXPECTED TOTAL ACCESS TIME

CROSS-REFERENCE TO RELATED APPLICATIONS

This application relates to co-pending patent application Ser. No. 09/481,233, titled "System and Method for Profiling Access to Disk Drive Commands Based on a Dual Servo Mode Model", and to co-pending patent application Ser. No. 09/481,231, titled "System and Method for Grouping Disk Access Commands in a Queue According to Proximate Disk Positions", which are filed by the same assignee as this application on even date herewith, and are incorporated herein by reference in their entirety.

FIELD OF THE INVENTION

The present invention relates to the field of data storage and particularly to a system and method for sorting I/O commands operations in rotating disk drives. More specifically, this invention relates to a computer program product for selecting the next command in an optimal way. Such selection is based on a probabilistic disk drive scheduling algorithm that reduces drive latency and improves its throughput.

BACKGROUND OF THE INVENTION

Computer systems or other accessories, collectively referred to as "computer systems", generally include data storage devices, such as hard disk drives. A hard disk drive is an electromechanical or an optical-mechanical device that reads from and writes to a hard disk that includes one or more disk platens. The main components of a disk drive are a spindle on which the platens are mounted, a drive motor for spinning the platens, one or more read/write heads, a seek mechanism for positioning the heads over the platens, and a controller which synchronizes read/write commands and transfers information to and from other components of the computer system.

In operation, the computer system provides logical instructions to its disk drive, to read or write data into storage locations on the disk. Although the instructions typically include a logical address for the data, the data is not stored in logical format; rather, the data is stored in a physical address location. The controller typically translates the logical address into a physical address. Once the translation occurs, the controller directs the heads to the physical address location at which the desired data is stored or read.

The amount of time from the start of the movement of the heads arm until the start of the read or write phase of an I/O command is referred to as the "access time". Access time is comprised of two components. The first component the seek and settling time, which is the time required to move a disk drive's read/write head to a specific track or cylinder on a disk and settling it on the target track. The second component is the rotational latency time, which corresponds to the additional time required for the disk to rotate so that the desired physical address location is located underneath the properly positioned head.

The available rotational time of a command is calculated based on the rotational position of the command and the current position of the head. If there is no chance that the command could be accessed at that time because of the radial distance, this rotational time is repeatedly incremented by one revolution time, until there is a positive probability of a successful access.

Each disk typically includes a plurality of concentric tracks, on one or both surfaces, from which information is read, or onto which information is written by a read/write element. In addition, each track is further divided into a plurality of sectors. A cylinder is formed by a plurality of tracks with the same radial coordinate on the stack of disks. In a disk drive, a disk rotates at a high speed while the read/write element "flies" over the surface of the rotating disk. The read/write element is positioned over specific areas or sectors of the disk in accordance with commands received from the computer system. The numerous commands of the computer system usually exceed the drive's ability to execute the commands immediately upon receipt, in which case a queue is formed. The set of commands available for execution by the disk drive is referred to as the "command queue".

Traditionally, controllers have been developed to reorder the command queue according to a positional sequence. Examples include reducing the number of changes in the direction of the movement of the head, ordering according to the shortest calculated head movement regardless of direction, and more commonly ordering according to the shortest overall access time between successive commands.

Numerous methods of drive scheduling have been devised to minimize the average access time. The conventional rule used by scheduling algorithms has been to choose the next read/write command from its local queue by essentially executing the earliest executable command. There is, however, some uncertainty with regard to the actual time it would take from the end of the currently active command, that is the command being currently executed, until the onset of execution of the next command. In part, this uncertainty is due to the fact that the seek and settling times are not absolutely deterministic. In some cases, due to the variance of the seek and settling time, the head will not be ready to start executing even though the correct rotational position has been attained. Another problem is that even if there were no uncertainty, once the start and end positions are taken into account, still there would not be sufficient time to calculate the precise access time while the scheduling algorithm is scanning the queue of commands.

In the event the actual access time is underestimated, a complete revolution may be lost. A common solution has been to add a "safety" margin (sometimes called a "fudge" factor) to the seek and settling time and establish a safe estimate of the time at which execution can start for certain. By adding this safety margin, the scheduling algorithm sometimes bypasses or delays a command if this command is not certain to be executed during the first revolution. Such approach could significantly and adversely affect the throughput of the disk drive.

Another disk scheduling method is illustrated in U.S. Pat. No. 5,570,332 to Heath et al that describes a method to reduce rotational latency in a disk drive by dividing the disk into discrete angular regions. The command queue is then sorted according to commands addressing cylinders or tracks within the angular region having the shortest rotational latency. The sorting algorithm searches the queue for commands addressing physical addresses beginning with those in neighboring angular regions. With each repositioning of the read/write head, the rotational latency of the angular regions from the new head location is reevaluated. However, the time estimates are based on adding safety margins and hence are biased.

Yet another disk scheduling method is exemplified in U.S. Pat. No. 5,664,143 to Olbrich, that describes a method for the rotational position queue to be initially ordered. A first command is chosen and assigned the physical address of its last requested block. Each remaining command in the queue is assigned the physical address of its first requested block. The address differences between each remaining command and the first command are converted into a time difference. The time required for the head to be positioned, the seek time, is subtracted from each time difference. For subtractions resulting in times less than zero an additional amount of time corresponding to a full revolution of latency is added. The commands are then sorted by the smallest time difference, such that the command with the shortest time difference becoming the next command. After the execution of the first command, the command with the shortest time difference is removed from the queue and the next command becomes the first command. The ordering algorithm is then repeated to determine a new next command. Though this scheduling algorithm may have met its objectives, there is nonetheless room for further optimization of expected access seek time by using probabilistic criteria to evaluate commands in the disk scheduling queue.

Still another disk scheduling method is illustrated in U.S. Pat. No. 5,854,941 to Ballard et al., that describes a disk scheduling queue for sorting pending disk I/O commands according to an estimated access time. The estimated access time is calculated from first and second rotational times that are derived from a rotational time table based on logical address and head movement time. Once the command is executed, the rotational positioning algorithm is repeated and the queue is resorted. However, the estimate results in a deterministic value rather than a weighted average that takes into account the probabilities of the possible values.

It is therefore clear that the ability of the head to be placed at the desired track has heretofore been either assumed to be a deterministic factor, or the rotational latency is assumed to provide a sufficient time for certain success of executing the command at the estimated time. Thus, there is still an unsatisfied need for a scheduling algorithm that selects commands based on an unbiased probabilistic approach, for reducing the disk drive latency and improving its throughput.

SUMMARY OF THE INVENTION

In accordance with the present invention, a computer program product is provided as a scheduling algorithm for use in disk drives to place I/O commands in a queue. The scheduling strategy is implemented by selecting commands based on a probabilistic approach that minimizes the expected next command access time. Thus, the present scheduling algorithm allows data to be accessed in the shortest expected amount of time possible, maximizes the throughput of the drive and improves the overall performance of the computer system.

The scheduling algorithm of the present invention improves the disk I/O average access time by estimating the expected access time (EAT) for the queued commands, and by selecting commands so that the command with the least EAT (LEAT) is executed first.

Whereas certain conventional scheduling algorithms rely on rotational latency or appended additional time to compensate for the uncertainty inherent in the seek and settling times, as described earlier, the probabilistic approach of the present invention does not postpone the execution of commands due to this uncertainty, but rather relies upon, and incorporates such uncertainty as a useful criterion in the comparison of commands. An exemplary criterion used in a preferred embodiment of the present invention is the least expected access time.

The least expected access time is a concept which is introduced herein, and which is derived by having the disk scheduling algorithm sort pending disk I/O commands into a disk scheduling queue according to the expected time necessary to reach the target positions on the disk. The probabilistic algorithm weights the possible access times of commands sorted in the disk scheduling queue, and accounts for the probability of the drive executing a command during the first possible revolution as well as the probability of the drive executing the command in the second possible revolution. Both of these probabilities are taken into consideration in reaching a final determination as to the queue order of the commands. This would eliminate the rigid deterministic approach followed by conventional scheduling algorithms and allow for taking calculated risks in scheduling commands so as to minimize the long-term average latency.

As an illustration, the scheduling algorithm assigns an Expected Access Time EAT(i) to an ith command as follows:

$$EAT(i)=(1-p(i))s(i)+p(i)(s(i)+r)=s(i)+rp(i),$$

where p(i) is the probability that a revolution will be missed, r is the one revolution time, and s(i) is the minimum time it would take to achieve the correct rotational position with nonzero probability of completing the seek and settling. The probability p(i) reflects various types of uncertainties, both intrinsic and resulting from the lack of computational resources. For simplicity purposes, the possibility of missing more than one revolution was neglected, though those skilled in the art could account for this factor without departing from the scope of the present invention.

According to one embodiment, the scheduling algorithm will assign an EAT to each of the commands in the queue. As a result, each of the queued commands will be provided with a single number rather than two numbers as explained above in connection with the conventional deterministic approach. The scheduling algorithm will then reorder the queue commands according to a desired LEAT scheme, for example according to-ascending expected access times, so that the command with the LEAT will be executed next.

According to an alternative embodiment, the probability p(i) does not have to be computed for every single command in the queue. Rather, depending on the current best candidate, if a command certainly cannot be accessed faster than the current best candidate, then this command will not be assigned an EAT.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

FIG. 3 is comprised of FIGS. 3A and 3B, and represents a flow chart that illustrates the operation of a preferred embodiment of the scheduling algorithm;

DETAILED DESCRIPTION OF THE INVENTION

Figure 1:
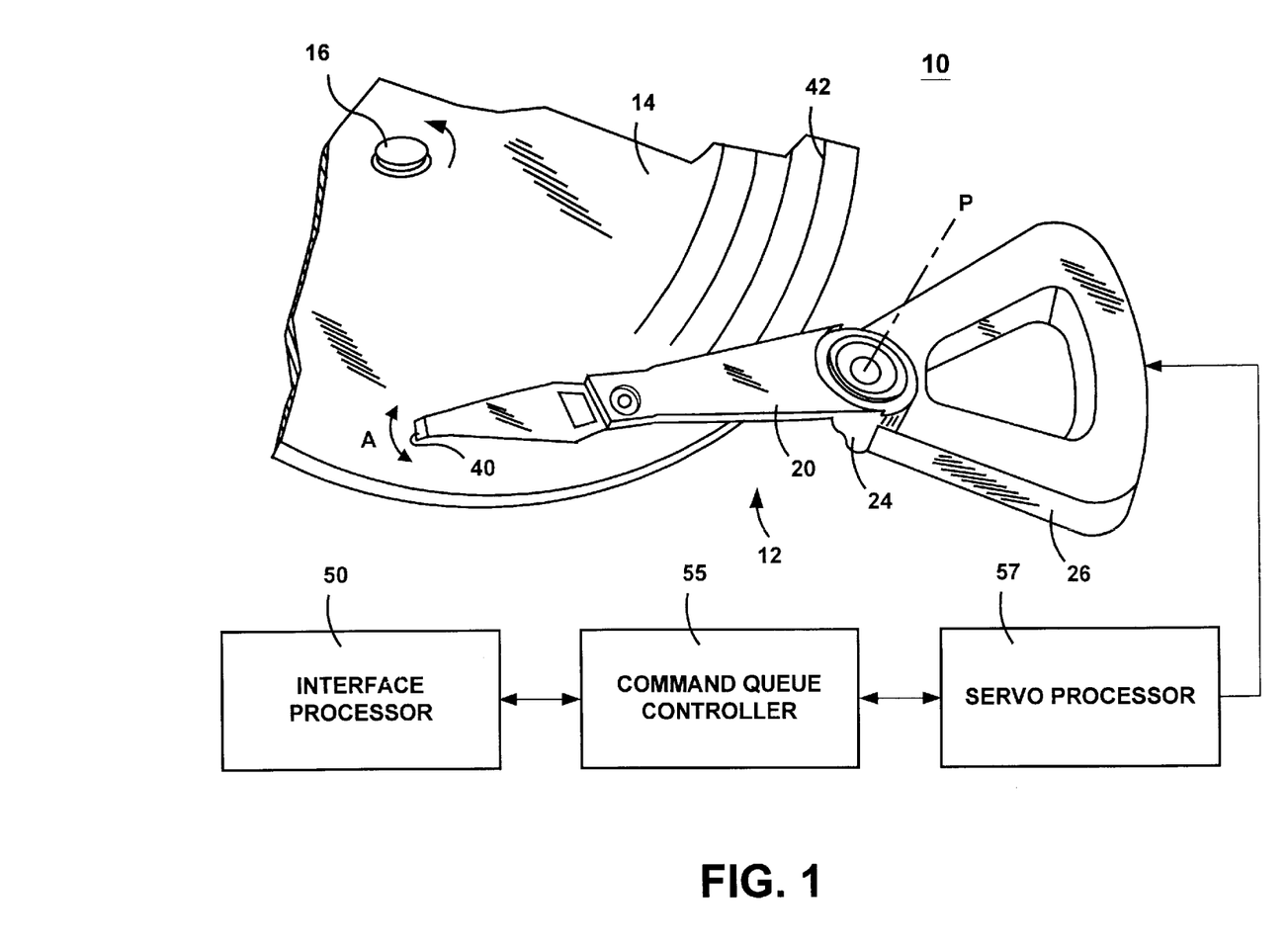
FIG. 1 is a schematic illustration of a disk drive that implements a scheduling algorithm according to the present invention.
Figure 2:
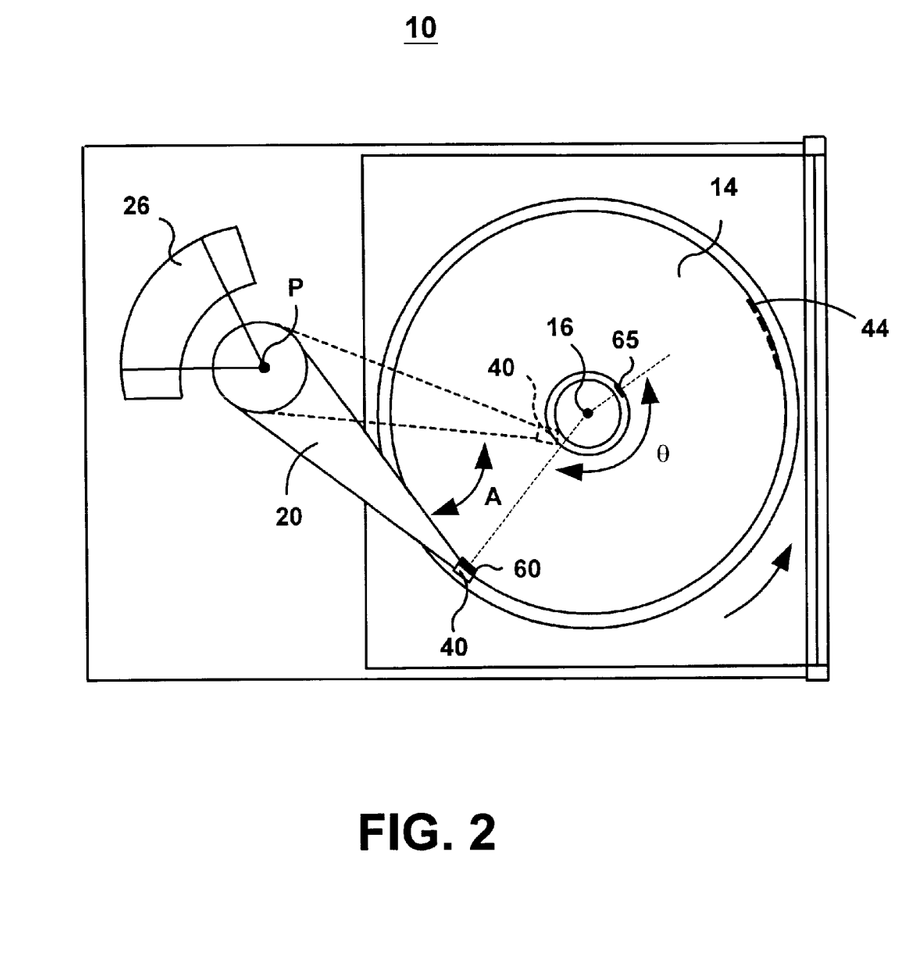
FIG. 2 is a schematic, top plan view of the disk drive of FIG. 1 viewed from a different angle.

FIGS. 1 and 2 illustrate a disk drive 10 comprised of a head stack assembly 12 and a stack of spaced apart magnetic, optical and/or MO data storage disks or media 14 that are rotatable about a common shaft 16. The head stack assembly 12 includes a number of actuator arms 20 that extend into spacings between the disks 14, with only one disk 14 and one actuator arm 20 being illustrated for simplicity of illustration.

The head stack assembly 12 also includes an E-shaped block 24 and a magnetic rotor 26 attached to the block 24 in a position diametrically opposite to the actuator arms 20. The rotor 26 cooperates with a stator (not shown) for the actuator arms 20 to rotate in a substantially radial direction, along an arcuate path in the direction of an arrow A. Energizing a coil of the rotor 26 with a direct current in one polarity or the reverse polarity causes the head stack assembly 12, including the actuator arms 20, to rotate around axis P in a direction substantially radial to the disks 14.

A transducer head 40 is mounted on the free end of each actuator arm 20 for pivotal movement around axis P. The magnetic rotor 26 controls the movement of the head 40 in a radial direction, in order to position the head 40 in registration with data information tracks or data cylinders 42 to be followed, and to access particular data sectors 44 on these tracks 42.

Numerous tracks 42, each at a specific radial location, are arrayed in a concentric pattern in a magnetic medium of each surface of data disks 14. A data cylinder includes a set of corresponding data information tracks 42 for the data surfaces of the stacked disks 14. Data information tracks 42 include a plurality of segments or data sectors 44, each containing a predefined size of individual groups of data records that are saved for later retrieval and updates. The data information tracks 42 can be disposed at predetermined positions relative to a servo reference index.

The location of each sector 44 is identified by a sector identification (SID) read by the head 40 from the disk surface. Each command is stored as an object of a linked list (or a data structure) representing the queue, and is characterized by a physical location on the surface of the disk 14, which occupies one or more data sectors 44. Each data sector is identified by a radial coordinate and an angular coordinate (also referred to as rotational position).

The disk drive 10 further includes an interface processor 50 which is coupled to a command queue controller 55 that links the interface processor 50 to the head stack assembly 12, via a servo processor 57. The interface processor 50 implements a scheduling algorithm that sets a queue execution order of the pending commands when the current I/O command is being executed. During operation, the command queue controller 55 receives the logical addresses of the commands from the interface processor 50, and translates them into physical addresses on the disks 14. The command queue controller 55 then sends control signals to the servo processor 57 to move the heads 40. In FIG. 1, the interface processor 50, the command queue controller 55 and the servo processor 57 are shown to constitute part of the disk drive 10. However, persons skilled in the art will recognize that these components may be provided as part of a separate host computer system.

Figure 3A:
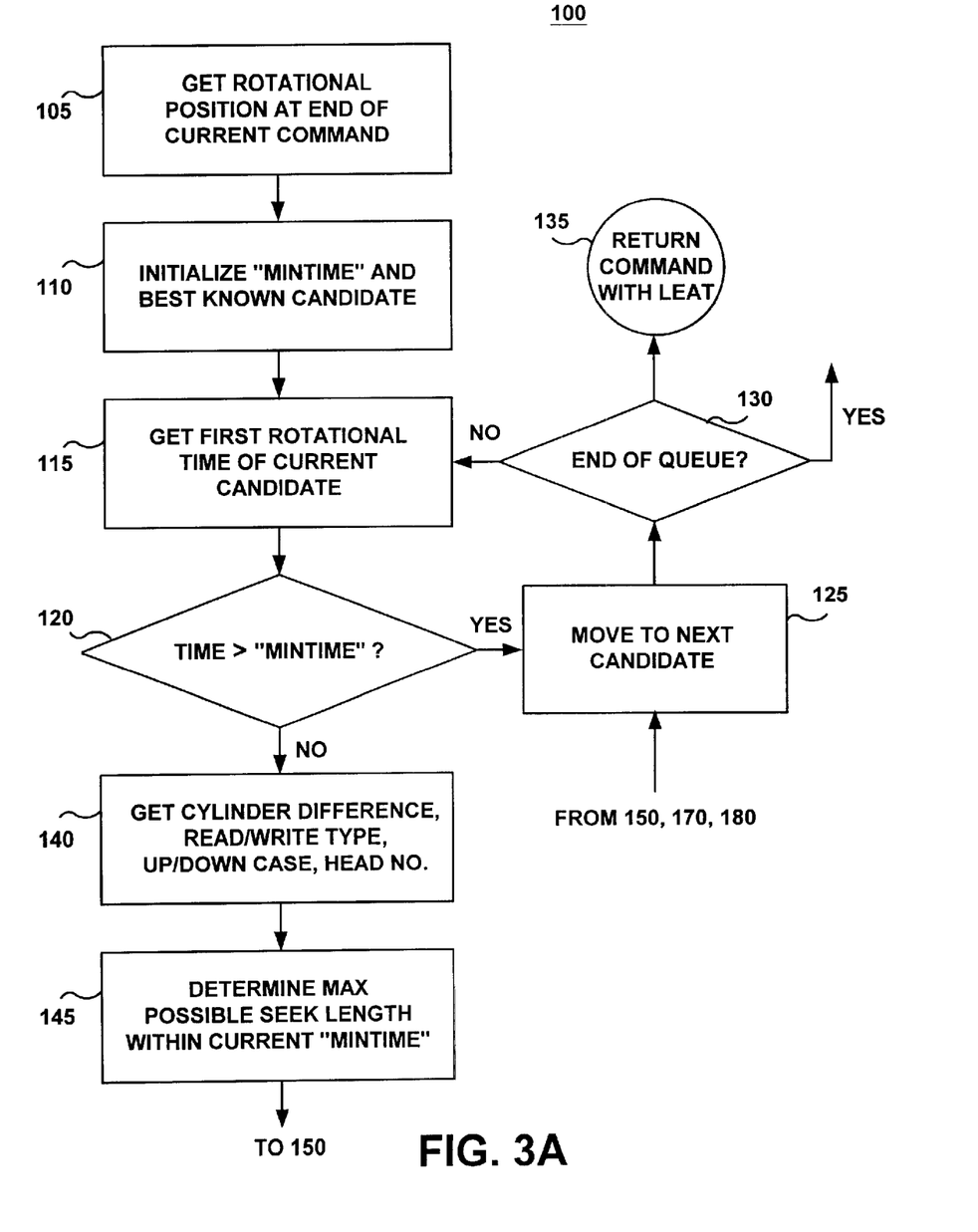
Figure 3B:
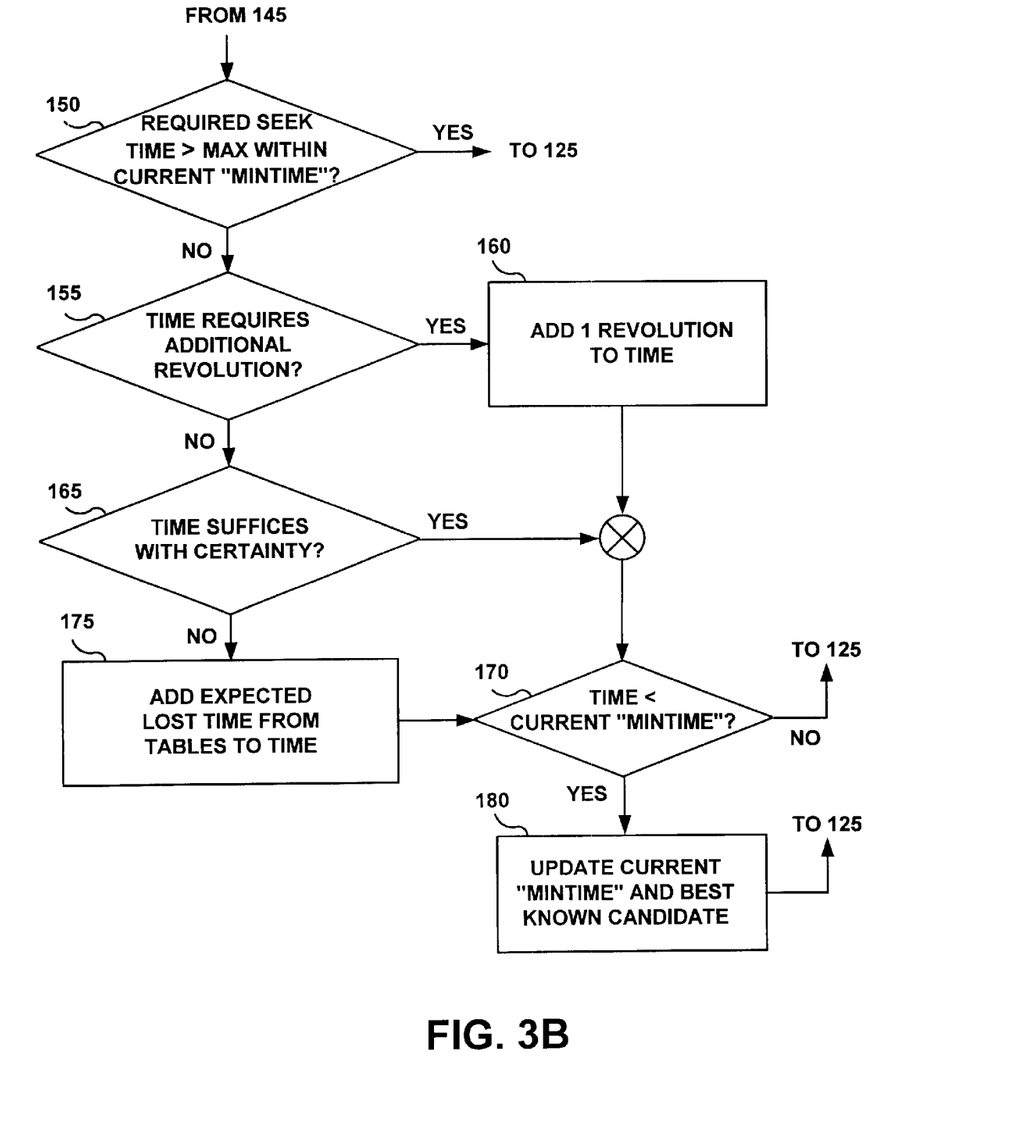

Having described the general environment in which the present invention can be used, its operation will now be described with further reference to FIG. 3 (FIGS. 3A and 3B). The present scheduling algorithm is implemented by the command queue controller 55 for sorting and scheduling commands in a command queue, to substantially minimize the long-term average access time of commands. As it will be explained below, the algorithm identifies a candidate command from the command queue with the least expected access time (LEAT), and reorders the command queue accordingly, so that this candidate command is executed following the current command. Using the LEAT leads to an approximately minimum average access time in the long run.

The scheduling algorithm is represented by a method 100 and illustrated in FIGS. 3A and 3B. The scheduling algorithm starts at block or step 105 by marking the end of the execution of the current command by the head 40. With reference to FIG. 2, an exemplary current command is denoted by the numeral reference 60. At step 110, the scheduling algorithm initializes "mintime", by setting it to a predetermined large value. As used herein, "mintime" denotes a program variable which is gradually decreased until it reaches a final minimum value.

At step 115, the scheduling algorithm acquires the first rotational time of a candidate command in the queue. With reference to FIG. 2, an exemplary candidate command is denoted by the numeral reference 65. The rotational time of the candidate command 65 is measured by the angular difference between the candidate command 65 relative to the end of the current command 60. In other terms, the rotational time of the candidate command 65 is the amount of time until the first time after the end of the current command that the rotational position of the candidate command will coincide with the rotational position of the head 40.

At decision step 120, the scheduling algorithm inquires whether the rotational time determined in step 115 is greater than a current "mintime", which is the shortest expected time for the drive 10 to access a candidate command among those that the command queue controller 55 has scanned so far. If the scheduling algorithm determines that the rotational time is greater than or equal to the current "mintime", which implies the existence of another command in the queue which is at least as appropriate for execution, then the scheduling algorithm bypasses the candidate command 65 and proceeds to the next command in the queue (step 125).

The scheduling algorithm then inquires, at decision step 130, whether the end of the queue has been reached, that is whether the scheduling algorithm has completed the scanning of all the commands in the queue. If it has, then it proceeds to step 135 where it returns the best found result or command with the least expected access time (LEAT). If, on the other hand, the end of the queue has not been reached, the scheduling algorithm returns to the beginning of the loop and considers the next command in the queue.

Returning to decision step 120, if the scheduling algorithm determines that the rotational time is less than the current "mintime", which implies that the candidate command 65 might be better than any previously scanned command, the scheduling algorithm checks additional conditions that would confirm, with a higher degree of certainty, whether or not the candidate command 65 has the least expected access time (LEAT) among previously scanned commands. To this end, the scheduling algorithm proceeds to step 140 where it acquires various parameters specific to the candidate command 65. These parameters include, for example, the cylinder difference, the read/write type, the direction of the movement of the head (inward or outward) and the head number.

Based on these parameters, the scheduling algorithm determines the maximum possible seek length within the current "mintime" at step 145. It then proceeds to decision step 150 (FIG. 3B) where it compares the required seek time for the candidate command 65 (obtained at step 140) with the maximum possible seek length within the current "mintime" (obtained at step 145). This approach allows the scheduling algorithm to optimize the calculation of seek time in that the scheduling algorithm is no longer required to dedicate time referring to look-up tables stored in the interface processor 50 for each candidate command 65. Rather, the scheduling algorithm checks only once the maximum seek time corresponding to the "mintime", and then compares the required seek time for the candidate command 65 to the maximum possible seek length within the current "mintime".

Figure 4:
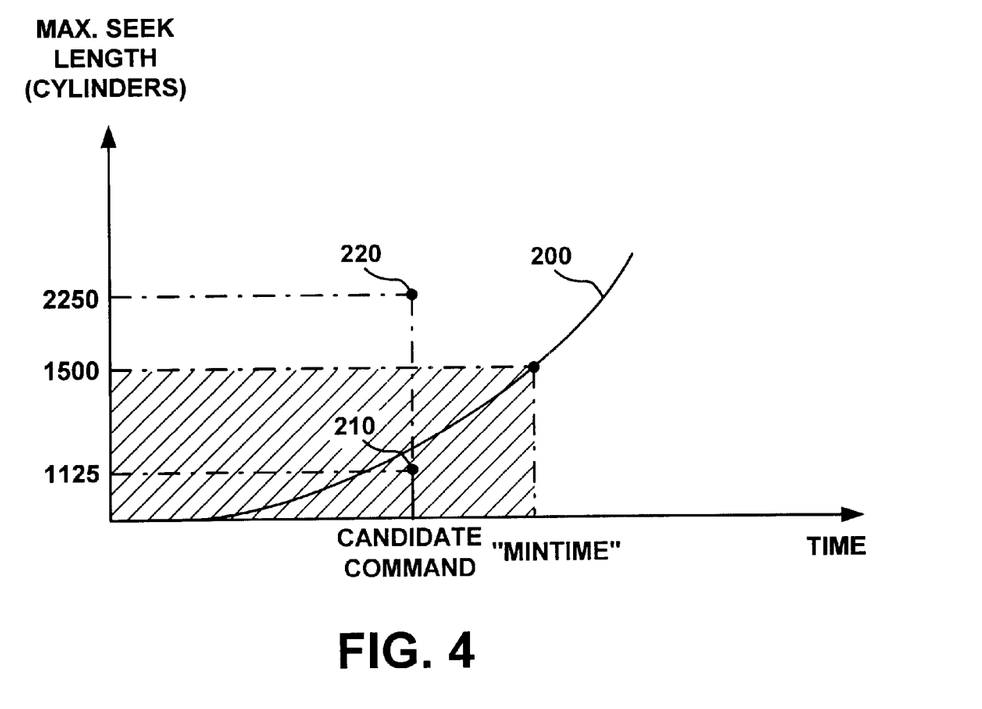
FIG. 4 is a graph that illustrates "mintime" versus the maximum seek length for a disk, and which is stored in tabular form in a processor of the disk drive of FIG. 1.

With reference to FIG. 4, it illustrates an exemplary graph 200 that charts the maximum possible seek length versus available rotational time which is stored as a look-up table in the memory of the interface processor 50. The shaded area, defined by the coordinates of the available rotational time and the coordinate axes, represents the maximum seek length values (measured in cylinders) for candidate commands, that are less than the maximum possible seek length corresponding to the rotational time.

If at step 150 the required seek time for the candidate command 65 is greater than the maximum seek length that is possible within the current "mintime", as exemplified by the value 220 that lies above the shaded area, the scheduling algorithm bypasses the candidate command 65 for not possessing the LEAT, i.e., the currently best known command is more appropriate than the candidate command. The scheduling algorithm then proceeds to step 125 (FIG. 3A) and runs the sequence of steps as described above.

If, however, at step 150 the required seek time for the candidate command 65 is found to be less than or equal to the maximum possible seek length within the current "mintime", as exemplified by the value 210 that lies within the shaded area (FIG. 4), the scheduling algorithm proceeds to perform more refined calculations that would confirm, with an even higher degree of accuracy, whether or not the candidate command 65 has the least expected access time.

To this end, the scheduling algorithm consults a table stored in the memory of the interface processor 50, and inquires at step 155 if, based on the parameters discovered so far, the candidate command may require an additional revolution to be added to the access time corresponding to the required seek length determined at step 140. In one embodiment, the stored look-up table provides two or more (e.g. five) columns of numbers that provide the probability of a successful execution of the candidate command 65. For example, one column provides the shortest seek length with the zero probability of success, and another column provides the length of the longest seek with unity probability of success.

At step 155, the scheduling algorithm compares the seek length of the candidate command 65 to the column with zero probability of success, and, if it determines that the seek of the candidate command is longer than the seek length in that column, then the candidate command time is increased by one revolution at step 160, and the scheduling algorithm proceeds to decision step 170. If at step 155 the scheduling algorithm determines that the seek of the candidate command is shorter than the seek length in the column with the zero probability of success, it does not increase the candidate command time by a revolution, but proceeds to decision step 165.

When appropriate, such as when the seek of the candidate command 65 is not longer than the seek length in the column with the zero probability of success, the scheduling algorithm determines at decision step 165 whether the command time suffices with certainty for the seek. To this end, the scheduling algorithm compares the seek of the candidate command with the seek length in the column time with unity probability of success, and if it determines that the candidate seek is shorter than, or equal to the seek length in that column, then the candidate command 65 is deemed to satisfy the condition of decision step 165, and the scheduling algorithm proceeds to step 170.

If, on the other hand, the scheduling algorithm determines that the required candidate time does not suffice with certainty, that is the candidate seek is longer than the seek time in the column, the scheduling algorithm proceeds to step 175, where it adds the expected lost time from look-up tables stored in the memory of the interface processor 50. This step is carried out as follows: Suppose the rotational time between the end of the current command 60 (FIG. 2) and the start of the candidate command is s. More precisely, it would take s time units for the rotational position of the head to change from that of the end of the current command 60 to that of the start of start of the candidate command.

From the point of view of the scheduling algorithm, the quantity s is a constant depending on the difference in rotational locations. On the other hand, it is sometimes not certain whether the next command could be executed at time s (measured from the completion of the current command) or rather at time s+r, where r is the (constant) time it takes to complete a full revolution. For simplicity purposes, the possibility of missing more than one revolution is neglected in this analysis, though it could be accounted for by persons skilled in the field. If the probability of the candidate command missing a revolution is denoted by p, then the expected access time (EAT) is expressed by the following formula:

$$EAT=s+rp.$$

The probability p reflects various uncertainties, both intrinsic and due to the lack of computational resources for a more accurate evaluation. As a result, if a command (i) in the queue has rotational time s(i) and probability of success p(i) during the first revolution, its expected access time (EAT), t(i), is expressed by the following equation:

$$t(i)=s(i)+rp(i).$$

The scheduling algorithm then proceeds to decision step 170, where it inquires whether the expected access time for the candidate command 65 obtained in step 140 is less than the current "mintime". If it is not, the scheduling algorithm bypasses the candidate command 65 and proceeds to the next command in the queue at step 125 as explained above. If, on the other hand, the expected access time for the candidate command 65 obtained in step 140 is less than the current "mintime", the scheduling algorithm proceeds to step 180, and updates the current "mintime" with the value of the current candidate command 65. It also stores the identity of the current command as the currently best known command.

Thereafter, the scheduling algorithm returns to steps 125 and 130 (FIG. 3A), as explained above, and terminates by selecting the command with the least expected access time (LEAT) or t(i) at step 135. This choice approximately maximizes the expected throughput of the disk drive 10, and avoids the bias introduced by safety margins. So, for example, if r=100, the scheduling algorithm would prefer a command (i) with a rotational time s(i)=20 and a missed revolution probability of p(i)=0.30 to a command (j) with a rotational time s(j)=55 and a miss probability of p(j)=0, even though the command (i) may miss the revolution with a probability of 30%, since 20+0.3(100)32 50<55. As used herein, "throughput" means the average number of commands per unit of time.

The scheduling algorithm includes an efficient implementation of the LEAT criterion, namely, that the probability of a missed revolution p(i) does not have to be computed for every single command in the queue. Depending on the current best candidate, a command can be seen to have no chance of being the best candidate in the queue, regardless of its probability p(i) of a missed revolution.

It is to be understood that the specific embodiments of the invention that have been described are merely illustrative of certain application of the principles of the present invention. Numerous modifications may be made to the scheduling algorithm described herein without departing from the scope of the present invention.

What is claimed is:

1. A system for reordering commands in a position queue, comprising:
   a data structure comprised of a plurality of objects for storing the commands, with each object being identified by a rotational position and a radial position;
   a scheduling algorithm for setting a queue execution order of pending commands while a current command is being executed;
   the scheduling algorithm identifying a candidate command with a least expected access time, and reordering the queue execution order so that the candidate command is executed following the current command;
   wherein the scheduling algorithm initializes a "mintime" variable;
   wherein the scheduling algorithm acquires a rotational time of a candidate command in a queue; and
   wherein if the rotational time is greater than the "mintime" variable, the scheduling algorithm bypasses the candidate command.

2. The system according to claim 1, wherein the "mintime" variable is gradually decreased until it reaches a minimum value.

3. The system according to claim 2, wherein the rotational time is measured by an angular difference between the candidate command relative to an end of the current command.

4. The system according to claim 3, wherein if the scheduling algorithm determines that the rotational time is less than the "mintime", the scheduling algorithm checks additional conditions that confirm, with a high degree of accuracy if the candidate command has the least expected access time (LEAT) among the commands reviewed so far.

5. The system according to claim 4, wherein the scheduling algorithm checks additional conditions by acquiring one or more parameters that are specific to the candidate command, and generates a required seek length for the candidate command.

6. The system according to claim 5, wherein the one or more parameters comprise any one or more of: a cylinder difference, an operation type, a movement direction of a head, or a head number.

7. The system according to claim 5, wherein the scheduling algorithm determines a maximum possible seek length within the "mintime".

8. The system according to claim 7, wherein the scheduling algorithm compares the required seek length for the candidate command with the maximum possible seek length; and wherein if the required seek length for the candidate command is greater than the maximum possible seek length, the scheduling algorithm bypasses the candidate command.

9. The system according to claim 8, wherein if the required seek length for the candidate command is less than the maximum possible seek length, the scheduling algorithm confirms with a higher degree of accuracy if the candidate command has the least expected access time by determining whether, based on the one or more parameters, the candidate command requires an additional revolution to be added to the required seek length.

10. The system according to claim 9, wherein the scheduling algorithm determines the expected access time (EAT) for the candidate command according to the following formula:

$$EAT = s + rp,$$

where s represents a rotational time between the end of the current command and a start of the candidate command, r represents a time constant to complete a full revolution, and p represents a probability of the candidate command missing a revolution.

11. The system according to claim 10, wherein if the expected access time for the candidate command is less than the "mintime", the scheduling algorithm updates the "mintime" with the expected access time (EAT) of the candidate command, and the "best candidate" with the identity of the current candidate.

12. A data storage system for storing I/O commands in a rotating disk drive by placing I/O commands in a queue, comprising:
   a plurality of objects for storing the commands, with each object being identified by a rotational position and a radial position;
   a scheduling algorithm for setting a queue execution order of pending commands while a current command is being executed;
   the scheduling algorithm identifying a candidate command with a least expected access time, and reordering the queue execution order so that the candidate command is executed following the current command;
   wherein the scheduling algorithm initializes a "mintime" variable;
   wherein the scheduling algorithm acquires a rotational time of a candidate command in a queue; and
   wherein if the rotational time is greater than the "mintime" variable, the scheduling algorithm bypasses the candidate command.

13. The data storage system according to claim 12, wherein the "mintime" variable is gradually decreased until it reaches a minimum value.

14. The data storage system according to claim 13, wherein if the scheduling algorithm determines that the rotational time is less than the "mintime", the scheduling algorithm checks additional conditions that confirm, with a high degree of certainty if the candidate command has the least expected access time (LEAT) among the commands seen so far, by acquiring one or more parameters that are specific to the candidate command, and generating a required seek time for the candidate command.

15. The data storage system according to claim 14, wherein the scheduling algorithm further determines a maximum possible seek length within the "mintime";
   wherein the scheduling algorithm compares the required seek time for the candidate command with the maximum possible seek length;

wherein if the required seek time for the candidate command is greater than the maximum possible seek length, the scheduling algorithm bypasses the candidate command; and wherein if the required seek time for the candidate command is less than the maximum possible seek length, the scheduling algorithm confirms with a higher degree of accuracy if the candidate command has the least expected access time by determining whether, based on the one or more parameters, the candidate command requires an additional revolution to be added to the access time.

16. The data storage system according to claim 12, wherein the scheduling algorithm determines an expected access time (EAT) for the candidate command according to the following formula:

$$EAT=s+rp,$$

where s represents a rotational time between the end of the current command and the start of the candidate command, r represents a time constant to complete a full revolution, and p represents a probability of the candidate command missing a revolution.

17. The data storage system according to claim 16, wherein if the expected access time for the candidate command is less than a "mintime", the scheduling algorithm updates the "mintime" with the expected access time (EAT) of the candidate command; and identifies the candidate command with the least expected access time (LEAT).

18. The data storage system according to claim 13, wherein the rotational time is measured by an angular difference between the candidate command relative to an end of the current command.

19. A computer program product for reordering commands in a queue, comprising:

a plurality of commands;

a scheduling algorithm for setting a queue execution order of pending commands while a current command is being executed;

the scheduling algorithm identifying a candidate command with a least expected access time, and reordering the queue execution order so that the candidate command is executed following the current command;

wherein the scheduling algorithm initializes a "mintime" variable;

wherein the scheduling algorithm acquires a rotational time of a candidate command in a queue; and wherein if the rotational time is greater than the "mintime" variable, the scheduling algorithm bypasses the candidate command.

20. The computer program product according to claim 19, wherein the "mintime" variable is gradually decreased until it reaches a minimum value.

21. The computer program product according to claim 20, wherein if the scheduling algorithm determines that the rotational time is less than the "mintime", the scheduling algorithm checks additional conditions that confirm, with a high degree of certainty if the candidate command has the least expected access time (LEAT) among the commands, by acquiring one or more parameters that are specific to the candidate command, and generating a required seek time for the candidate command.

22. The computer program product according to claim 21, wherein the scheduling algorithm further determines a maximum possible seek length within the "mintime";

wherein the scheduling algorithm compares the required seek length for the candidate command with the maximum possible seek length;

wherein if the required seek length for the candidate command is greater than the maximum possible seek length, the scheduling algorithm bypasses the candidate command; and wherein if the required seek length for the candidate command is less than the maximum possible seek length, the scheduling algorithm confirms with a higher degree of certainty if the candidate command has the least expected access time by determining whether, based on the one or more parameters, the candidate command requires an additional revolution to be added to the required seek length.

23. The computer program product according to claim 19, wherein the scheduling algorithm determines an expected access time (EAT) for the candidate command according to the following formula:

$$EAT=s+rp,$$

where s represents a rotational time between the end of the current command and the start of the candidate command, r is represents a time constant to complete a full revolution, and p represents a probability of the candidate command missing a revolution.

24. The computer program product according to claim 23, wherein if the expected access time for the candidate command is less than a "mintime", the scheduling algorithm updates the "mintime" with the expected access time (EAT) of the candidate command; and identifies the candidate command with the least expected access time (LEAT).

25. The computer program product according to claim 20, wherein the rotational time is measured by an angular difference between the candidate command relative to an end of the current command.

26. A method for reordering commands in a queue, comprising:

storing the commands;

setting a queue execution order of pending commands while a current command is being executed;

identifying a candidate command with a least expected access time;

reordering the queue execution order so that the candidate command is executed following the current command; and wherein reordering the queue execution order comprises:
initializing a "mintime" variable;
acquiring a rotational time of a candidate command in the queue; and
wherein if the rotational time is greater than the "mintime" then bypassing the candidate command.

27. The method according to claim 25, wherein reordering the queue execution order comprises:

gradually decreasing the "mintime" variable until the it reaches a minimum value.

28. The method according to claim 27, wherein reordering the queue execution order further comprises if the rotational time is less than the "mintime" then checking additional conditions that confirm, with a high degree of accuracy if the candidate command has the least expected access time (LEAT) among the commands seen so far, by acquiring one or more parameters that are specific to the candidate command, and generating a required seek time for the candidate command.

29. The method according to claim 28, wherein reordering the queue execution order comprises:
   determining a maximum possible seek length within the "mintime";
   comparing the required seek length for the candidate command with the maximum possible seek length;
   if the required seek length for the candidate command is greater than the maximum possible seek length, then bypassing the candidate command; and
   if the required seek length for the candidate command is less than the maximum possible seek length, then confirming with a higher degree of accuracy if the candidate command has the least expected access time by determining whether, based on the one or more parameters, the candidate command requires an additional revolution to be added to the access time.

30. The method according to claim 26, wherein reordering the queue execution order comprises determining an expected access time (EAT) for the candidate command according to the following formula:

$$EAT = s + rp,$$

where s represents a rotational time between the end of the current command and the start of the candidate command, r represents a time constant to complete a full revolution, and p represents a probability of the candidate command missing a revolution.

31. The method according to claim 30, wherein reordering the queue execution order comprises:
   if the expected access time for the candidate command is less than a "mintime", then scheduling algorithm updates the "mintime" with the expected access time (EAT) of the candidate command; and
   identifying the candidate command with the least expected access time (LEAT).

32. The method according to claim 27, wherein reordering the queue execution order comprises measuring the rotational time by calculating an angular difference between the candidate command relative to an end of the current command.

33. A system for reordering commands in a position queue, comprising:
   a data structure comprised of a plurality of objects for storing the commands, with at least some the objects identified by rotational positions;
   a scheduling algorithm for setting a queue execution order of pending commands while a current command is being executed;
   the scheduling algorithm identifying a candidate command with a least expected access time, and reordering the queue execution order so that the candidate command is executed following the current command
   wherein the scheduling algorithm initializes a "mintime" variable;
   wherein the scheduling algorithm acquires a rotational time of a candidate command in a queue; and
   wherein if the rotational time is greater than the "mintime" variable, the scheduling algorithm bypasses the candidate command.

34. The system according to claim 33, wherein the "mintime" variable is gradually decreased until it reaches a minimum value.

35. The system according to claim 34, wherein the rotational time is measured by an angular difference between the candidate command relative to an end of the current command.

36. The system according to claim 35, wherein the rotational time is measured by an angular difference between the candidate command relative to an end of the current command.

37. The system according to claim 35, wherein if the scheduling algorithm determines that the rotational time is less than the "mintime", the scheduling algorithm checks additional conditions that confirm, with a high degree of accuracy if the candidate command has the least expected access time (LEAT) among the commands reviewed so far.

38. The system according to claim 37, wherein the scheduling algorithm checks additional conditions by acquiring one or more parameters that are specific to the candidate command, and generates a required seek length for the candidate command.

39. The system according to claim 38, wherein the one or more parameters comprise any one or more of: a cylinder difference, an operation type, a movement direction of a head, or a head number.

40. The system according to claim 38, wherein the scheduling algorithm determines a maximum possible seek length within the "mintime".

41. The system according to claim 40, wherein the scheduling algorithm compares the required seek length for the candidate command with the maximum possible seek length; and
   wherein if the required seek length for the candidate command is greater than the maximum possible seek length, the scheduling algorithm bypasses the candidate command.

42. The system according to claim 41, wherein if the required seek length for the candidate command is less than the maximum possible seek length, the scheduling algorithm confirms with a higher degree of accuracy if the candidate command has the least expected access time by determining whether, based on the one or more parameters, the candidate command requires an additional revolution to be added to the required seek length.

43. The system according to claim 42, wherein the scheduling algorithm determines the expected access time (EAT) for the candidate command according to the following formula:

$$EAT = s + rp,$$

where s represents a rotational time between the end of the current command and a start of the candidate command, r represents a time constant to complete a full revolution, and p represents a probability of the candidate command missing a revolution.

44. The system according to claim 43, wherein if the expected access time for the candidate command is less than the "mintime", the scheduling algorithm updates the "mintime" with the expected access time (EAT) of the candidate command, and the "best candidate" with the identity of the current candidate.

* * * * *